United States Patent
Manne et al.

(10) Patent No.: US 7,451,792 B2
(45) Date of Patent: Nov. 18, 2008

(54) TIRE SUPPORT RING

(75) Inventors: Philippe Marie Etienne Manne, Warken (LU); Frank Philpott, Waldbredimus (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/995,860

(22) Filed: Nov. 23, 2004

(65) Prior Publication Data

US 2006/0108037 A1    May 25, 2006

(51) Int. Cl.
*B60C 17/04* (2006.01)
*B60C 17/06* (2006.01)
(52) U.S. Cl. ....................... 152/158; 152/520
(58) Field of Classification Search .......... 152/158, 152/520
See application file for complete search history.

(56) References Cited

U.S. PATENT DOCUMENTS

| | | | |
|---|---|---|---|
| 1,610,238 A * | 12/1926 | Benson | ............ 152/158 X |
| 3,509,928 A | 5/1970 | Aghnides | |
| 3,730,214 A * | 5/1973 | Ross | |
| 3,844,325 A * | 10/1974 | Betancourt | ............ 152/158 |
| 3,982,576 A * | 9/1976 | Replin | |
| 4,281,700 A * | 8/1981 | Ross | ............ 152/158 |
| 4,573,509 A | 3/1986 | Smith et al. | |
| 5,685,926 A | 11/1997 | Kejha | |
| 5,888,608 A | 3/1999 | Tsai | |
| 6,564,842 B2 | 5/2003 | Abinal et al. | |
| 7,237,589 B2 * | 7/2007 | Christenbury et al. | ... 152/520 X |
| 2002/0148546 A1 * | 10/2002 | Tabor et al. | |
| 2003/0168142 A1 * | 9/2003 | Bernadot et al. | ............ 152/158 |

FOREIGN PATENT DOCUMENTS

| | | |
|---|---|---|
| EP | 721854 | 7/1996 |
| EP | 836957 | 4/1998 |

* cited by examiner

*Primary Examiner*—Adrienne C Johnstone
(74) *Attorney, Agent, or Firm*—June E. Rickey

(57) ABSTRACT

A run flat safety support ring intended to be mounted on a wheel rim inside a tire equipping a vehicle for supporting the tire tread in case of loss of inflation pressure has a generally cylindrical crown intended to come in contact with the interior of the tire tread in the event of the loss of inflation pressure, but has a clearance from the tire tread interior at normal pressure. The ring also has an annular body located radially inward of the crown, the annular body comprising a grid of continuous reinforcement composite.

11 Claims, 5 Drawing Sheets

TIRE SUPPORT RING

FIELD OF THE INVENTION

The present invention is directed towards a support ring to support the underside of a tire during reduced pressure operation. More specifically, disclosed is a composite grid reinforced rim insert designed to support a tire during reduced pressure operation.

BACKGROUND OF THE INVENTION

Numerous devices have already been designed to enable tires to continue to operate during reduced pressure conditions. One typical device is an elastomer ring mounted on the rim of a wheel inside the pneumatic tire fitted to the wheel. The elastomer ring has an annular base clamped onto the tire rim, holding the beads of the tire pressed against rim flanges. The ring has a radially-projecting annular portion extending towards the tire tread which, in the event of a reduced tire pressure, acts to support the underside of the tread, enabling the vehicle operator to continue driving without having to stop immediately to change the tire. U.S. Pat. No. 6,076,578 discloses one such device.

Another type of device is shown in U.S. Pat. No. 6,564,842. The insert is mounted on the tire rim and is not required to contact the tire beads; instead the tire beads are designed to lock into the tire rim during reduced pressure operation. Again, the radially outer surface of the insert supports the underside of the tire during reduced pressure operation.

The goal of both types of rim inserts is to provide the tire with support and enable the vehicle operator to continue to operate the vehicle for at least another 50 km at a safe operating speed. This continued operation gives the operator time to reach a safe location where the tire can be changed.

Several concerns for such devices has been the weight added to the vehicle by the presence of four rim inserts increasing the overall weight of the tire/wheel system, and the durability of the rim insert. Ideally, the rim insert has an optimized reduced weight and an optimized increased durability to withstand the forces to which it will be subjected during run-flat operation.

SUMMARY OF THE INVENTION

The present invention is directed towards a rim insert to support the underside of a tire tread during run-flat operation. The rim insert, or support ring, is designed for optimized reduced weight, while achieving high durability characteristics.

Disclosed is a run flat safety support ring intended to be mounted on a wheel rim inside a tire equipping a vehicle for supporting the tire tread in case of loss of inflation pressure. The support ring has a generally cylindrical crown intended to come in contact with the interior of the tire tread in the event of the loss of inflation pressure, but has a clearance from the tire tread interior at normal pressure. The ring also has an annular body located radially inward of the crown, the annular body comprising a grid of continuous reinforcement composite.

In one aspect of the invention, the continuous reinforcement composite forming the grid of the annular body is selected from the group consisting of epoxy pre-impregnated fibers and metal matrix composites. Alternatively, the continuous reinforcement composite may be a glass fiber reinforced plastic or a carbon fiber reinforced plastic.

In another aspect of the invention, the grid of continuous reinforcement composite forming the annular body is an open cellular grid formed by a plurality of intersecting ribs. The open cellular grid forms a plurality of polygonal shaped cells.

In another aspect of the invention, the intersecting ribs forming the open cellular grid of the annular body are a plurality of ribs inclined at angles of 90° or less relative to the circumferential direction of the ring. In another aspect, the ribs may be inclined at angles of 30° to 60° relative to the circumferential direction of the ring. In another aspect, there are a combination of laterally extending ribs and at least one set of circumferentially extending ribs.

In another aspect of the invention, to improve ride comfort, the radially outer surface of the support ring may be provided with a rubber crown. Preferably, the support ring is provided with a U-shaped rubber crown that envelopes the sides of the support ring.

BRIEF DESCRIPTION OF THE DRAWINGS

The invention will be described by way of example and with reference to the accompanying drawings in which.

DETAILED DESCRIPTION OF THE INVENTION

Figure 1:
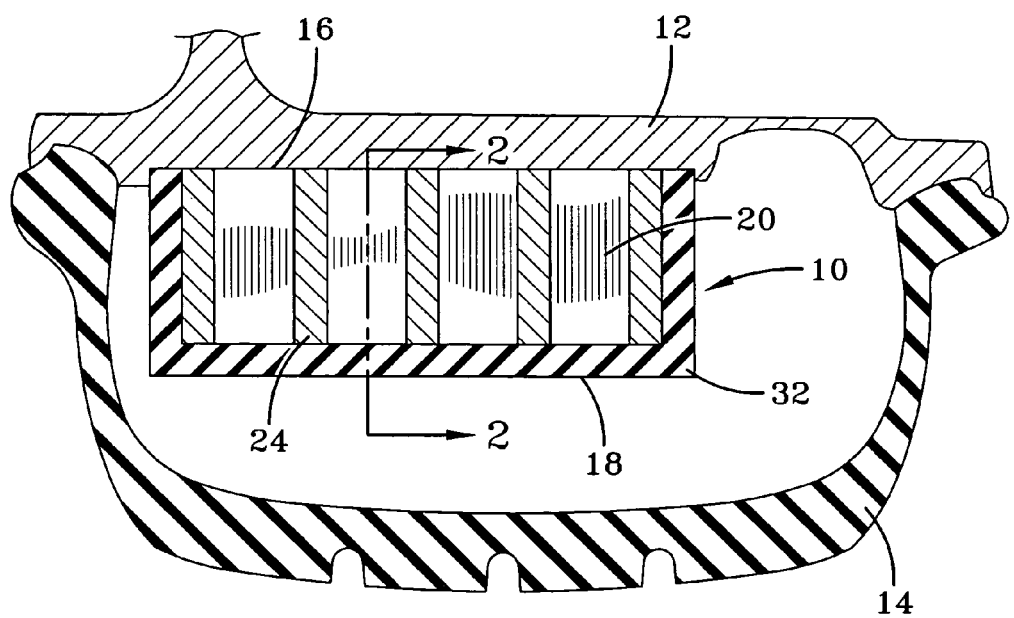
FIG. 1 is an axial cross sectional view of a tire/wheel system, including a rim insert ring.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

Figure 2:
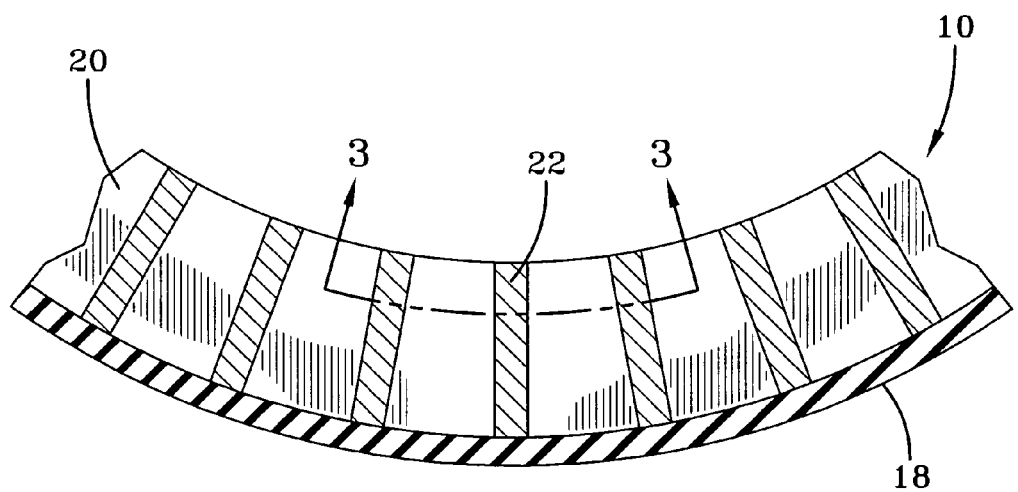
FIG. 2 is a circumferential cross sectional view of the rim insert ring.

FIGS. 1 and 2 illustrate a support ring 10 in accordance with the present invention. The ring 10 is mounted around a tire rim 12, and inside the cavity of a corresponding tire 14. The rim 12 is asymmetrical, and has a platform 16 on which the support ring is mounted. The support ring 10 is generally cylindrical and has a crown 18 and an annular body 20 located radially inward of the crown 18. The crown 18 is intended to come into contact with the interior of the tire 14 in the event of the loss of inflation pressure. During normal inflation pressure, as seen in FIG. 1, there is clearance between the crown 18 and the tire inside. The annular body 20 is a series of intersecting ribs forming a grid.

Figure 3:
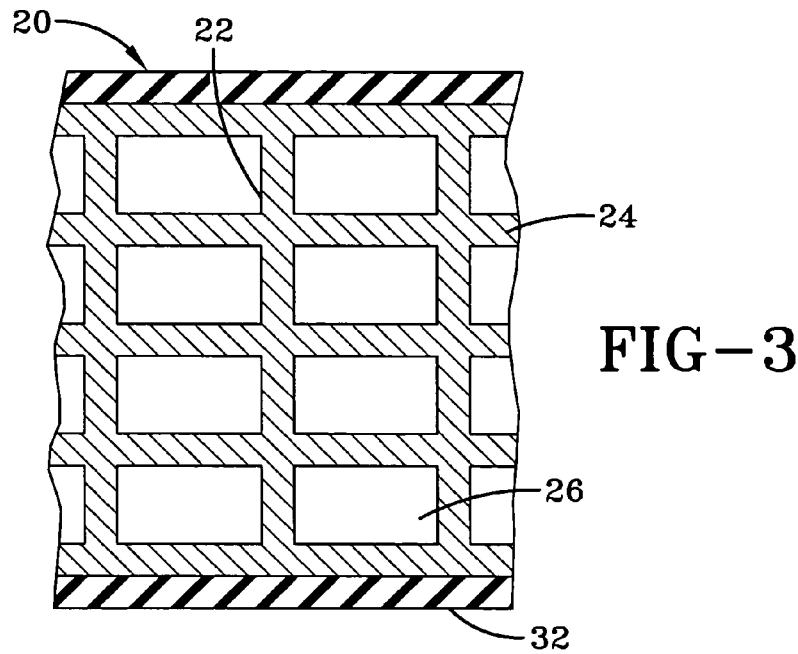
FIG. 3 is a view of the ring.
Figure 3A:
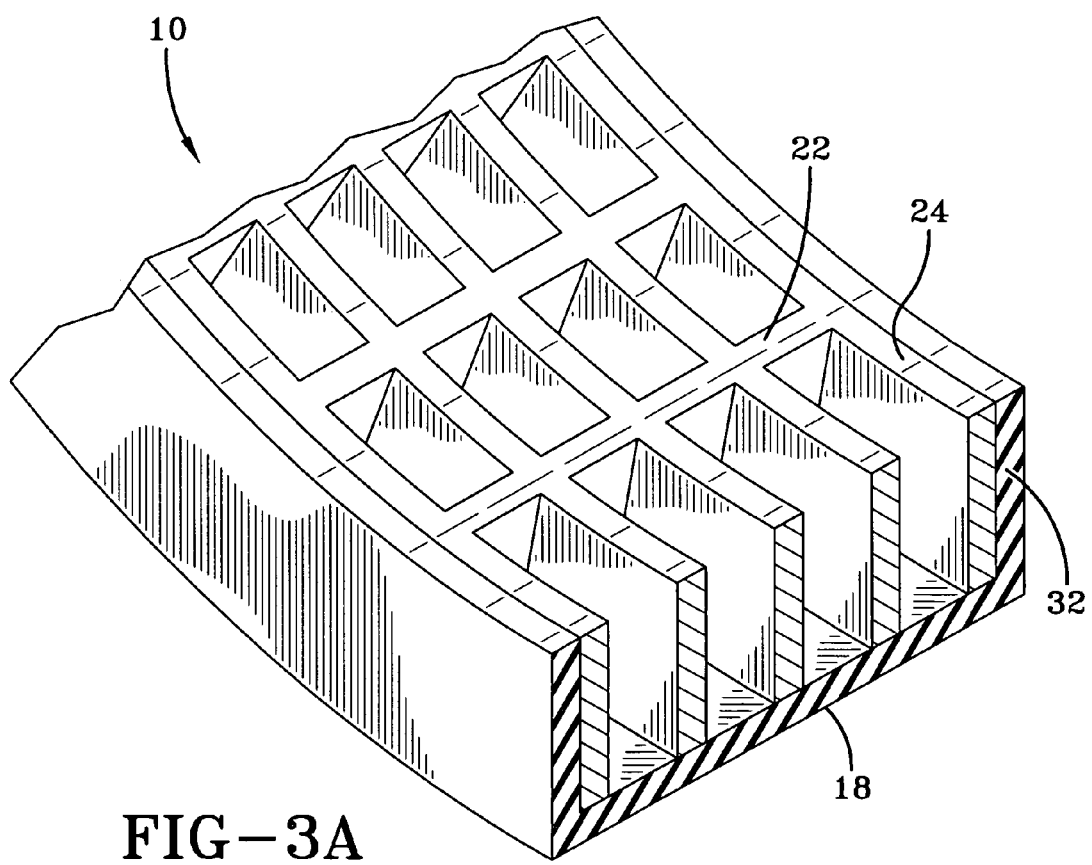
FIG. 3A is an isoview of the insert ring of FIG. 3.

FIGS. 3 and 3A show one embodiment of the support ring 10. The support ring 10 has a series of lateral ribs 22 and a series of circumferentially extending ribs 24, forming an open cell grid. The ribs 22, 24 intersect at 90° angles, forming rectangular or square cells 26. The relative spacing between adjacent lateral ribs 22 and the circumferentially extending ribs 24 dictates the cellular shape. The cellular shape formed by the grid can be any polygonal shape, such as triangles, rectangles, squares, trapezoids, parallelograms.

The openness of the grid provides the support ring 10 with the desired lightweight characteristic. To provide the support ring 10 with the necessary strength, the grid is fabricated using continuous reinforcement composites. One group of continuous reinforcement composites is epoxy pre-impregnated fibers, such as glass fiber reinforced plastics, carbon fiber reinforced plastics, or an aluminum-fiberglass composite formed from alternating layers of fiberglass and aluminum. Another group is metal matrix composites. Metal matrix composites might better sustain fatigue damage in the high frequency impact loading to which the support ring will be subjected during run-flat operations. One form of metal matrix composites includes an aluminum/rubber composite formed of alternating layers of aluminum and rubber. A combination composite is also permissible, such as a composite formed of aluminum, fiberglass, and rubber stacking.

Manufacturing of the grid is accomplished in the following manner. A grooved female mold, laid out in the manner desired for the grid is prepared. Preferably, the mold is formed from a hard lightweight material such as polyethylene or any semi-rigid plastic. The mold has an internal diameter equivalent to the rim platform diameter. The reinforcement filaments are then wound in the mold grooves. The entire built up structure is then cured. The curing mechanism is dependent upon the reinforcement composite being employed. Basic teachings regarding forming of grids can be found in U.S. Pat. No. 5,888,608.

Figure 4:
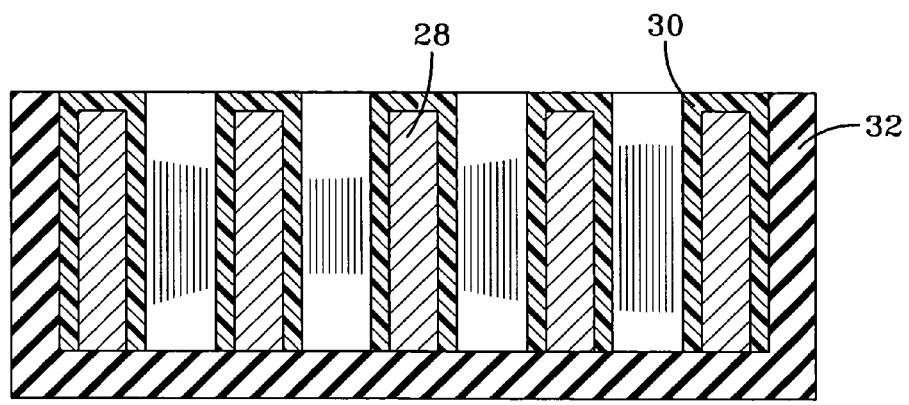
FIG. 4 is a cross sectional view of the rim insert ring.

Following curing of the reinforced composite, the cured composite is removed from the mold. Should removal from the mold prove difficult, or if desired for strength reasons, the composite 28 may be left in the mold 30; the mold 30 acting as a protective wrapping for the cured composite 28 and being part of the support ring annular body 20. The body 20 may be covered by an inverse U-shaped rubber crown 32, see FIGS. 3A and 4. If employed, this rubber crown 32 protects the composite grid structure upon contact with the rolling deflated tire 14, dampens impacts, and improves comfort by cushioning shocks.

Figure 3B:
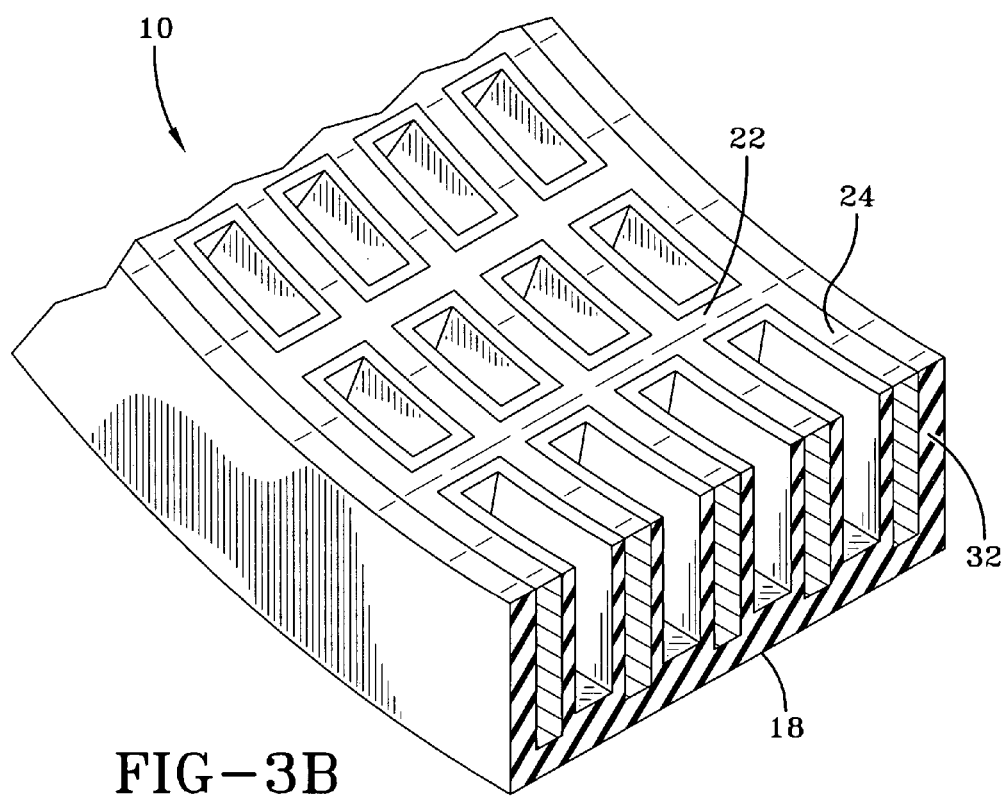
FIG. 3B is an alternative construction of the support ring of FIG. 3.

Alternatively, the female mold may be formed from a rubber material. The rubber mold has a toroidal shape, with an internal diameter equivalent to the rim platform diameter. The mold grooves may face outward of the toroidal configuration requiring external winding of the reinforcement composite or the mold grooves may face inward of the toroidal configuration requiring internal winding of the reinforcement composite. When the mold grooves face outward, the elastomeric material must be of sufficient flexibility to permit the formed grid to be released from the mold after curing. Preferably, the mold grooves face inward, and after curing, the female mold becomes the rubber crown 32 of the support ring 10. To prevent overcuring of the elastomeric female mold, the mold may only be partially cured prior to winding of the reinforcement composite. Partial curing of the rubber mold will ensure adequate support stiffness for winding of the reinforcement composite. The mold and composite are then cured together, forming a solid structure. The resultant support ring 10 has the rubber crown extending into the depth of the ring, protecting each rib 22, 24 of the ring 10, as seen in FIG. 3B.

The support ring 10 is inserted on the rim 12 during assembly of the run-flat tire system. Due to the tight clearance between the inner diameter of the support ring 10 and the tire rim platform 16, a lubricant may be applied to either the inner diameter of the support ring 10 or the tire rim platform 16. To reduce any possible rim contamination due to the lubricant, it is preferred to lubricate the support ring 10.

Another alternative is to build the support ring 10 in two sections. For such a construction, each ring half is provided with a continuous solid rib on each edge. Prior to placement on the tire rim 12, a room temperature self-curing adhesive is applied to each solid rib at the edges of the ring halves. Protective clamps may be applied at each connection point along the lateral edges of the ring. These clamps may also be glued to keep the clamps in place. Alternatively, the ring halves may be bolted together at the edge ribs by means of traditional nuts and bolts.

Figure 5:
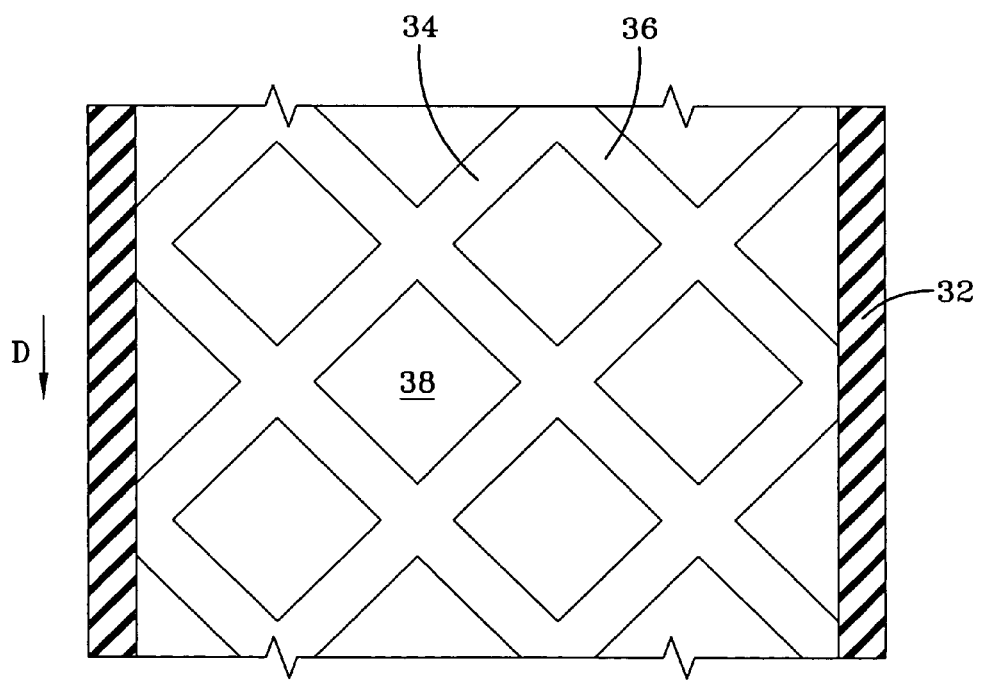
FIGS. 5-7 are various embodiments of the rim insert ring.

FIG. 5 illustrates another embodiment of the grid for the support ring 10. The ribs 34, 36 forming the grid are inclined at equal but opposite angles, forming a plurality of diamond shaped openings 38. The ribs 34, 36 are illustrated inclined at 45° relative to a circumferential direction D of the ring 10. The ribs 34, 36 may be inclined at any angle between 30 and 60° relative to the circumferential direction D of the ring 10. The rib inclination angle and spacing between adjacent ribs 34, 36 are dictated by the desired weight and strength characteristics desired for the support ring 10.

Figure 6:
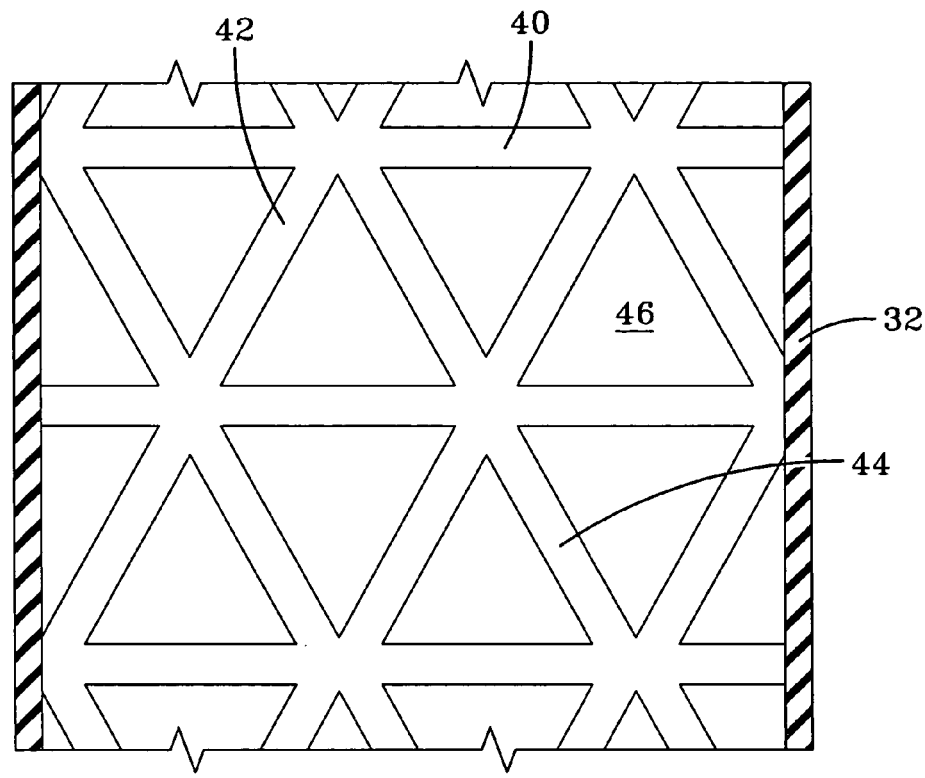
Figure 7:
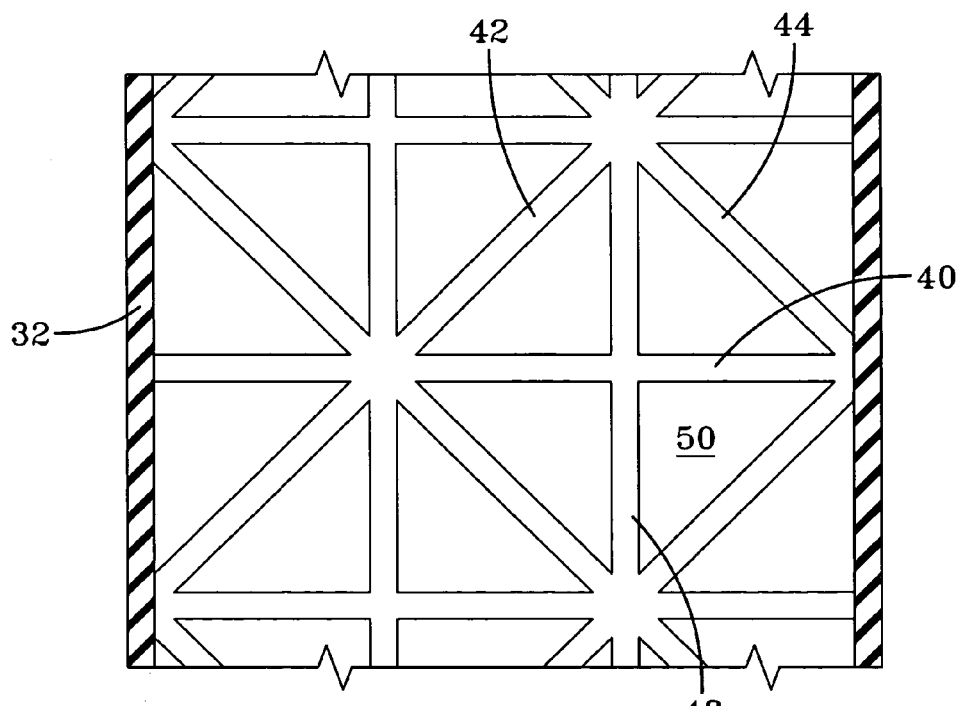

The ribs 40, 42, 44, 48 may also form triangular shaped openings 46, 50 see FIGS. 6 and 7. In the grid configuration of FIG. 6, the grid is formed from a series of laterally extending ribs 40, and two sets of circumferentially inclined ribs 42, 44. The inclined rib sets 42, 44 are inclined at equal and opposite angles from each other. The ribs 42, 44 are illustrated as being inclined at 60° relative to the lateral ribs, but may be inclined at any angle between 30° and 75° relative to the lateral ribs 40.

The grid configuration of FIG. 7 is similar to that of FIG. 6. The grid includes a set of circumferentially extending ribs 48, inclined at 90° relative to the laterally extending ribs 40. The circumferentially extending ribs 48 divide the isosceles triangular cells 46 of FIG. 6 into right-angled triangle cells 50.

The configurations employing inclined rib sets, such as those shown in FIGS. 5-7, provide the greater durability for run-flat applications. The inclined ribs avoid any sudden contact of the entire rib width as the tire 14 travels through its rotation. The inclined rib configuration for the support ring 10 ensures that a relatively constant volume of ribs is in contact with the rotating deflated tire at any one time.

The composite grid support ring 10, intended to be mounted on an asymmetric rim 12, can be used on any type of pneumatic tire intended to be used in low pressure operation, such as a self-supporting tire. The support ring 10 is also not limited to use with tires designed solely for low pressure operation.

In comparison to inserts used with conventional pneumatic tires, the composite grid support ring 10 is lighter than a solid metallic or solid rubber insert. Since the support ring 10 is mostly hollow, heat dissipation is much more efficient than with a solid structure. Additionally, the grid structure 20 of the rubber-covered ring 10 reduces heat accumulation in comparison to a continuous circumferential metallic insert or solid rubber insert.

Additionally, while actual dimensions of the ring 10 are dependent upon the actual size of the tire 14 and rim 12 to be employed in combination with the support ring 10, it should be appreciated that the wider the support ring 10, the greater the support being provided to the tire 14. Under underinflated operating conditions, a wider support improves run flat handling by yielding a wider contact footprint, and this increased contact area provides for a larger load carrying capacity of the run-flat tire assembly.

What is claimed is:

1. A safety support ring for enabling a vehicle to run on a deflated tire, mounted in an assembly comprising a pneumatic tire and a wheel rim, said insert being mounted inside the air cavity of the tire and secured to the wheel rim, the support ring comprising:

a generally cylindrical crown intended to come in contact with the interior of the tire tread in the event of the loss of inflation pressure, and leaving a clearance from the tire tread interior at normal pressure;

an annular body located radially inward of the crown, the annular body consisting of an open cellular grid formed by a plurality of intersecting three-dimensional ribs, wherein the plurality of ribs extends from the crown to a location radially inward of the crown, and wherein the grid is comprised of a continuous reinforcement composite selected from the group consisting of epoxy pre-impregnated fibers and metal matrix composites.

2. A support ring in accordance with claim 1 wherein the continuous reinforcement composite is a glass fiber reinforced plastic, a carbon fiber reinforced plastic, or an aluminum/fiberglass composite.

3. A support ring in accordance with claim 1 wherein the intersecting ribs comprise a plurality of ribs intersecting at angles of 90° or less relative to the circumferential direction of the ring.

4. A support ring in accordance with claim 1 wherein the intersecting ribs comprise a plurality of ribs intersecting at angles of 30° to 60° relative to the circumferential direction of the ring.

5. A support ring in accordance with claim 1 wherein the intersecting ribs comprise laterally extending ribs and at least one set of circumferentially extending ribs, the circumferentially extending ribs being inclined at an angle of 90° or less relative to the circumferential direction of the support ring.

6. A support ring in accordance with claim 1 wherein the intersecting ribs form polygonal shaped cells.

7. A support ring in accordance with claim 1, the ring further comprising a rubber crown.

8. A support ring in accordance with claim 1, the ring further comprising a U-shaped rubber crown.

9. A support ring in accordance with claim 1, the ring further comprising a rubber crown wherein the grid of continuous reinforcement composite is encased in rubber on all sides except the radially innermost side of the support ring.

10. The support ring of claim 1 wherein the ribs are circumferentially spaced at intervals from a first end of the ring to a second end.

11. The support ring of claim 1 wherein the grid comprises a plurality of laterally spaced ribs joined with a plurality of circumferential ribs.

* * * * *